May 26, 1959 — F. V. BOOKOUT ET AL — 2,888,165
PACKAGE VENDING MACHINE
Filed March 11, 1954 — 3 Sheets-Sheet 2
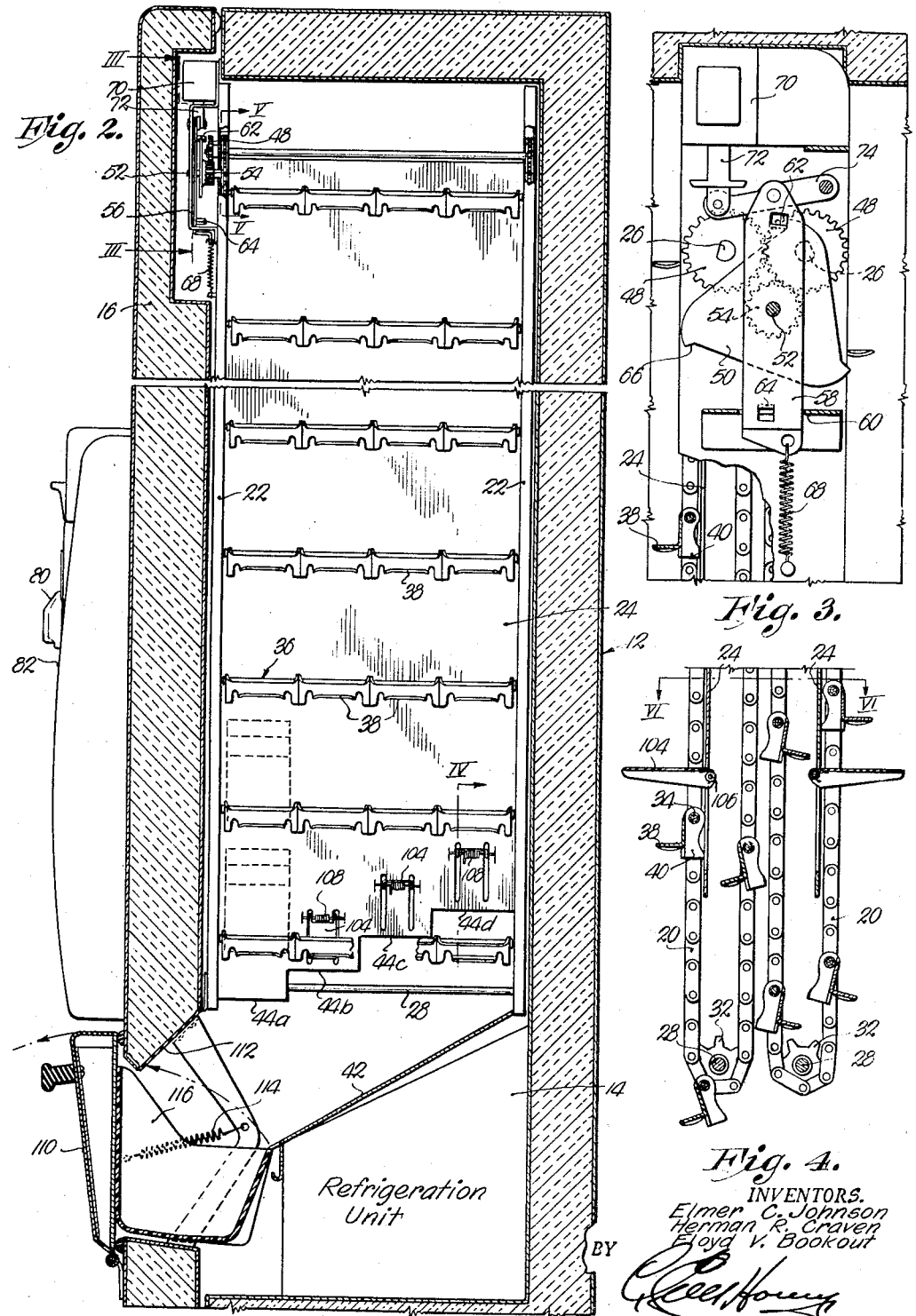
INVENTORS.
Elmer C. Johnson
Herman R. Craven
Floyd V. Bookout
BY
ATTORNEY.

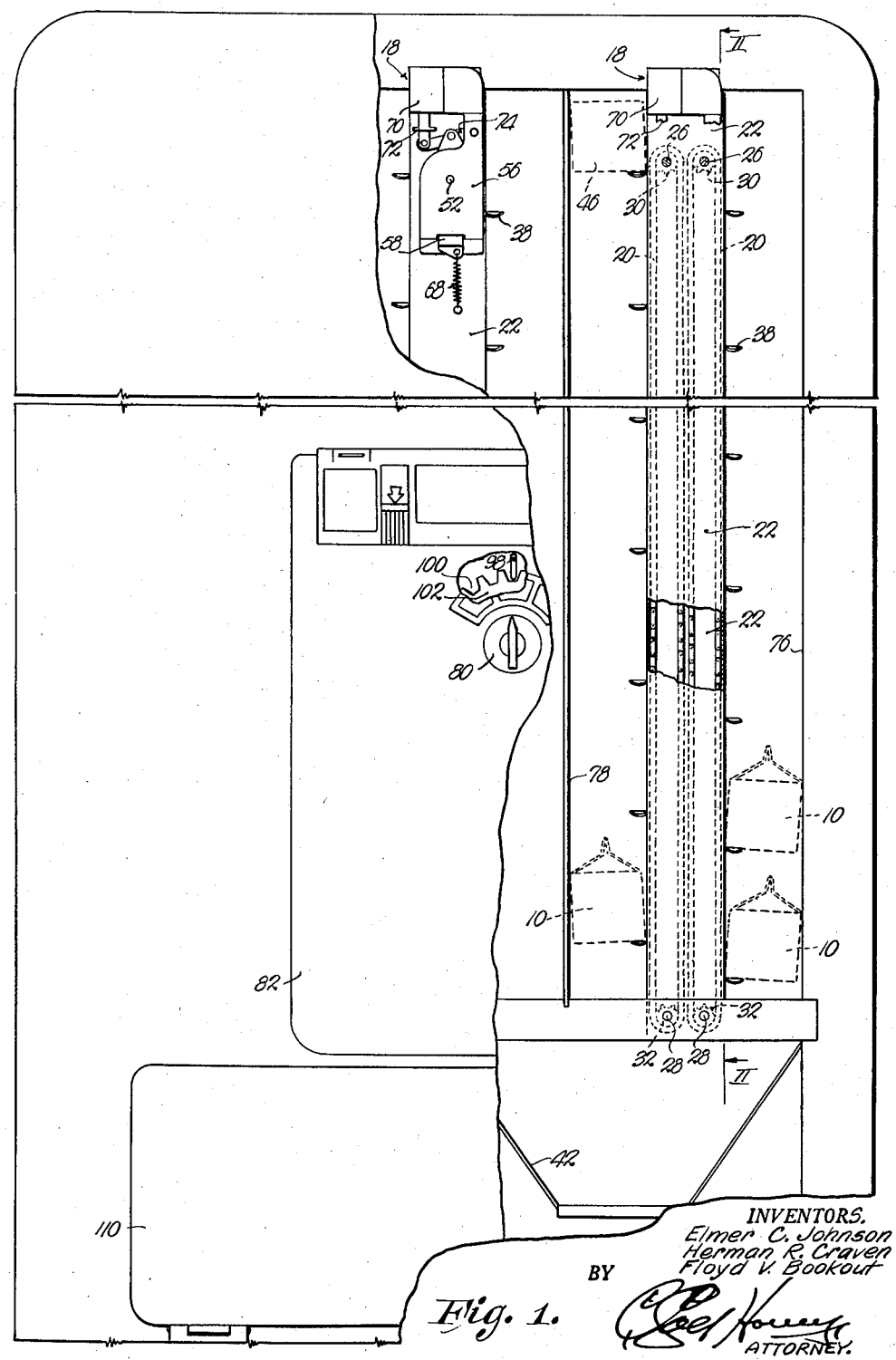

INVENTORS.
Elmer C. Johnson
Herman R. Craven
Floyd V. Bookout
BY
ATTORNEY.

United States Patent Office 2,888,165
Patented May 26, 1959

2,888,165
PACKAGE VENDING MACHINE

Floyd V. Bookout, Herman R. Craven, and Elmer C. Johnson, Kansas City, Mo., assignors to The Vendo Company, Kansas City, Mo., a corporation of Missouri Application March 11, 1954, Serial No. 415,574

7 Claims. (Cl. 221—77)

This invention relates to automatic vending apparatus and has for its primary object the provision of a vending machine equipped with self-actuated vending mechanism so arranged and designed as to present a relatively small, lightweight, compact unit capable of accommodating an unusually large number of articles of vendible merchandise and adapted even to permit selection of various types of the merchandise which the machine is adapted to handle.

It is the most important object of the instant invention to provide in an article vending machine, internal mechanism operable on the principle of gravity through the force of the weight of the articles themselves and having a plurality of movable units each of which is in turn provided with a vertical series of shelves swingably mounted to tip and, therefore, dump the article of merchandise into a discharge chute at the lowermost ends of the units.

Another important object of the present invention is to provide a vending machine including the aforementioned tippable shelves riding along a vertical wall so as to be normally held in a position for receiving the articles of merchandise, the wall in turn being provided with a stemmed lowermost end or edge arranged to provide for proper timed sequential operation or synchronization so that but a single article is delivered during each actuation of the machine.

A still further object of the invention about to be described and in the interest of compactness and saving in storage space, is the provision of a series of conveyor chains arranged in back-to-back pairs, each pair operating simultaneously and controlled by a novel escapement mechanism for imparting step-by-step movement to the conveyors.

Still further objects include the way in which the shelves themselves are made so as to slide along their retaining walls; the manner of swingably mounting the shelves on the chains for tipping movement when the same move past their retaining wall; the way in which antitheft means within the path of travel of the shelves yield thereto and automatically return to an operable position; the way in which pairs of conveyor chains are driven simultaneously through a gear train; the manner of connecting the control mechanism with the said train of gears; and many other objects including important details of construction, all of which will be made clear as the following specification progresses.

In the drawings:

Figure 1 is a fragmentary, front elevational view of a package vending machine made pursuant to the present invention, parts being broken away for clearness.

Fig. 2 is a fragmentary, vertical, cross-sectional view taken on line II—II of Fig. 1.

Fig. 3 is an enlarged, fragmentary, detailed, cross-sectional view taken on line III—III of Fig. 2.

Fig. 4 is an enlarged, fragmentary, cross-sectional view taken on line IV—IV of Fig. 2.

Figure 5:
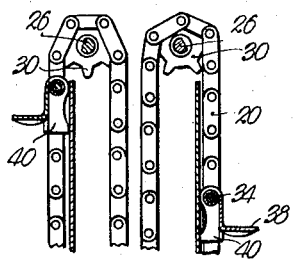
Fig. 5 is an enlarged, detailed, cross-sectional view taken on line V—V of Fig. 2.

The nature of the articles of merchandise which the vending machine about to be described is particularly adapted to handle, is clearly illustrated in Fig. 1 of the drawings, and for purposes of illustration, therefore, there is shown a polygonal cardboard carton 10 of the kind that is conveniently used to contain milk, fruit juices and other liquids.

It is to be understood however, that the invention is not limited to any particular type of article of merchandise and has been designed to vend a rather large number of differing types of vendible articles.

The machine includes an insulated cabinet broadly designated by the numeral 12 so that where need be, the articles 10 may be refrigerated through use of a typical unit 14 adapted for such purpose and contained within the cabinet 12. To the end that the machine may be loaded with the merchandise 10, cabinet 12 is provided with a relatively large, normally closed access door 16.

The vending mechanism within the cabinet 12 includes a plurality of side-by-side, individual assemblies, each of which is broadly designated by the numeral 18, it being understood that one assembly may contain a plurality of milk cartons, another assembly 18 adapted to vend orange juice, a third asembly 18 being loaded with still another type of merchandise if desired.

Figure 6:
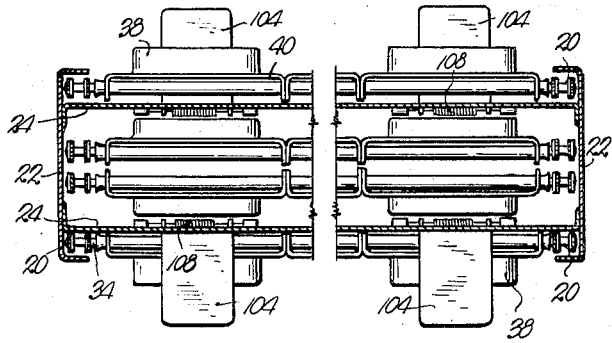
Fig. 6 is a transverse, cross-sectional view taken on line VI—VI of Fig. 4.

The assemblies 18 are identical and each includes a pair of back-to-back, endless, preferably chained conveyors 20 mounted for movement around horizontal axes and, therefore, each having an ascending and a descending stretch. To this end, therefore, there is provided a pair of opposed, vertical channel members 22 secured within the cabinet 12 in spaced-apart relationship and interconnected by spaced, vertical walls 24, all as best seen in Fig. 6 of the drawings. Uppermost shafts 26 and lowermost shafts 28 all disposed horizontally and in parallelism, span the distance between the end walls or channel members 22 and are carried thereby.

Each shaft 26 has a pair of spaced sprocket wheels 30 rigid thereto and each shaft 28 is provided with a pair of spaced sprocket wheels 32 for receiving the conveyors 20. It is seen in Fig. 4 of the drawings that the descending stretches of the conveyors 20 are disposed exteriorly of the walls 24, whereas the ascending stretches of the conveyor chains 20 are disposed in relatively close juxtaposition between the two walls 24 of each assembly 18.

Each conveyor 20 is provided with a plurality of spaced, horizontal rods 34 interconnecting the two chains thereof. Each rod 34 receives a plurality of side-by-side shelves 36, four of such shelves being illustrated in Fig. 2 on each rod 34 respectively. Shelves 36 are all identical and, therefore, in addition to being arranged in horizontal alignment they are disposed in a series of side-by-side vertical rows.

Each shelf 36 is provided with a lateral projection 38 adapted to receive an article 10 in the manner shown by Fig. 1, together with a pair of spaced ears 40 extending oppositely to the projections 38 and sliding along the corresponding wall 24 when the shelves 36 are descending with the outer stretches of the conveyors 20. The ears 40 of the shelves 36 are freely rotatable on the rods 34 and as long as the ears 40 are in sliding engagement with the walls 24, the projections 38 remain horizontal and in supporting relationship to the cartons 10.

However, the walls 24 are so terminated at their lowermost ends as to permit tilting or tipping of the shelves 36 so as to dump or discharge its article 10 into an inclined receiving chute 42 within the cabinet 12. As shown in Fig. 2, each wall 24 is stepped at its lowermost edge to present a series of progressively higher edge portions 44a, 44b, 44c and 44d. Accordingly, the shelf 36 at the extreme right in Fig. 2, will be the first to discharge its article 10 into the chute 42 by virtue of its ears 40 clearing the edge 44d of the corresponding wall 24. Cartons 10 will be successively discharged at edges 44c, 44b and 44a until all of the cartons 10 of one horizontal row thereof have been vended into the chute 42.

Conveyors 20 are gravity-actuated by the force of the weight of the cartons 10 on the shelves 36 and such movement may be supplemented by an additional weight 46 on one of the shelves 36, if desired, as shown in Fig. 1. Gravitational movement is restrained however, by ratcheting or escapement mechanism detailed in Fig. 3 of the drawings. To this end, a pair of intermeshing gears 48 rigid to the shafts 26 are held against rotation through the medium of a toothed plate 50 fixed to a stub shaft 52 upon which is secured a pinion 54 for rotation therewith and in meshing relationship with one of the gears 48.

One of the walls 22 carries a bracket 56 and cooperates therewith in rotatably supporting the stub shaft 52.

An elongated, vertical, reciprocable latch 58 guided by an opening 60 in bracket 56, has a pair of spaced, inturned ears 62 and 64 that cooperate with teeth 66 of plate 50 in normally holding both conveyors 20 against movement. A spring 68 connecting the lower end of latch 58 with the proximal wall 24, yieldably holds the latch 58 biased toward the lowermost end of its path of travel. Power means for raising the latch 58 may take the form of a solenoid 70 having its vertical reciprocable core 72 pivotally connected with a link 74 swingable on bracket 56 and in turn pivotally connected with the upper end of latch 58.

The outermost cartons 10 tilt against an inner wall 76 of the cabinet 12 as shown in Fig. 1 and slide therealong during their descent, whereas, the remaining cartons 10 slide along vertical partitions 78 between the assemblies 18 within cabinet 12 as depicted by Fig. 1.

Figure 7:
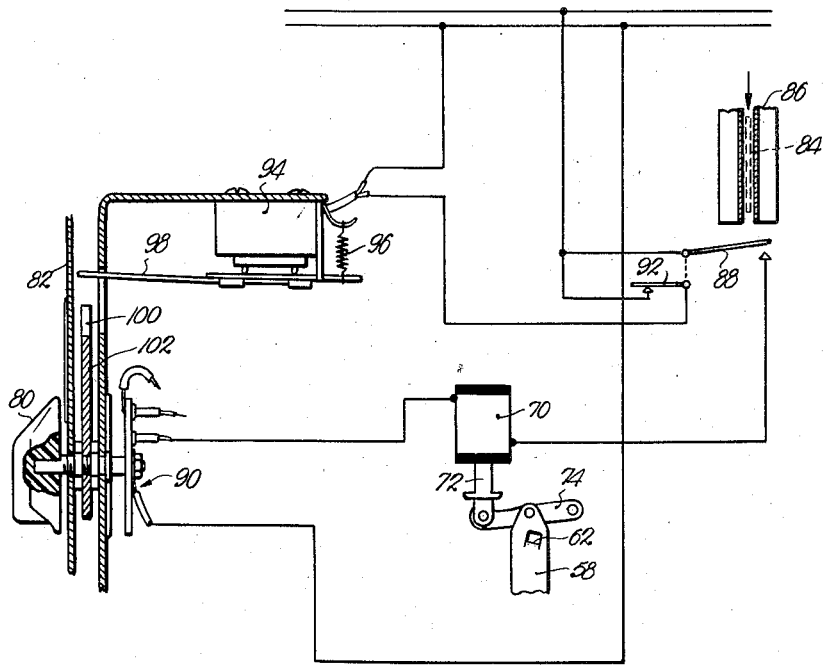
Fig. 7 is a schematic view illustrating the electrical components of the machine, parts being broken away and in section to reveal details of construction of the customer selector unit.

The assembly 18 which is actuated during each operation of the machine is placed under the control of the potential purchaser of the articles 10. Selection is made by actuation of a pointer knob 80 at the front of the machine and upon a coin-control mechanism housing broadly designated by the numeral 82. Such coin mechanism forms no part of the present invention and, therefore, has not been illustrated. It is suffice to point out that the same may include spurious coin-rejection means and any accepted coin 84 (Fig. 7) descending along coin chute 86, will close a switch 88 to close one of the solenoids 70 depending upon the selection made by the customer upon operation of the knob 80. Selector switch 90 to which the knob 80 is connected, may be of conventional character and merely operate to selectively place any chosen solenoid 70 in circuit with coin switch 88.

As the switch 88 is closed, a second switch 92 ganged therewith, opens to deenergize a solenoid 94 permitting a spring 96 to swing a locking finger 98 downwardly into an aligned notch 100 of a disc 102 connected with the pointer knob 80 for rotation therewith. Thus, after the customer makes his selection by rotating knob 80 and, therefore, disc 102, to in turn place selector switch 90 in circuit with one of the solenoids 70, the locking finger 98 moves to a position to prevent further rotation of the knob 80 while the switch 88 is closed and, therefore, while the selected solenoid 70 is energized.

An anti-theft device 104 is provided on each wall 24 respectively for each vertical row of shelves 36 respectively. Devices 104 are in the nature of elongated, paddle-like extensions swingable on walls 24 by horizontal pivot pins 106. The rearmost edges of the devices 104 normally bear against the outer faces of the walls 24 and are yieldably held biased in such operable position by springs 108. The anti-theft devices 104 are in the path of travel of the shelves 36 and by virtue of the springs 108 readily yield thereto as the shelves 36 descend and come into engagement with the devices 104.

Further anti-theft means is provided in a relatively small access door 110 normally closing an opening 112 in the door 16. Door 110 is swingable to and from a closed position and held biased toward the closed position shown in Fig. 2 by a spring 114. Packages 10 emanating from the chute 42 fall into a hopper 116 carried my the door 110 for swinging movement therewith. When the door 110 is open, hopper 116 is exposed for reception of the package 10 therewithin and moves to a position closing the opening 112 as is clear by arrows in Fig. 2 of the drawings. A separate chute 42, door 110 and hopper 116 may be provided for each assembly 18 or, if preferred, there may be a chute 42, an access door 110 and a hopper 116 common to all of the assemblies 18.

While the operation has been made relatively clear during the above description, by way of summary, the potential customer makes an initial selection of the product which he desires to purchase by actuating the knob 80. This places the selector switch 90 in series with one of the solenoids 70 so tthat when the coin 84 is inserted in chute 86 to close coin switch 88, such solenoid 70 will cause operation of the corresponding assembly 18. No accidental misalignment of the selector switch 90 will occur because of the fact that coin 84 also opens switch 92 to energize solenoid 94 and cause finger 98 to move into a notch 100 aligned therebelow.

As soon as solenoid 70 is energized, its core 72 is retracted upwardly to swing the link 74. This raises the latch 58 against the action of spring 68, releasing the uppermost ear 62 from engagement with one of the teeth 66 of plate 50. The plate 50 is, therefore, free to rotate approximately 60° until one of the teeth 66 comes into engagement with the lowermost ear 64 of latch 58.

Both conveyors 20 will operate and all of the cartons 10 carried thereby, will descend toward the chute 42. However, no vending will take place until after the coin 84 drops into the coin collection box (not shown) within housing 82. Switch 88 will thereupon re-open, solenoid 70 will deenergize, and spring 68 will pull the latch 58 downwardly to the position illustrated in Fig. 3. Plate 50 will thereupon rotate another 60°, the articles 10 will descend still further, and one of the shelves 36 will tip by virtue of its ears 40, clearing the corresponding edge 44a, 44b, 44c and 44d.

The carton 10 will slide downwardly and forwardly along the chute 42 into hopper 116, whereupon the purchaser may swing the secondary door 110 outwardly and receive his merchandise. If the next customer inserts a coin 84 without turning the knob 80, he will receive the same type of merchandise.

At this point it is to be made clear that articles are discharged alternately from the conveyors 20 because of the staggered relationship of their shelves 36 as shown in Fig. 4.

The anti-theft devices 104 are always in a position to prevent any malicious attempt to steal the contents of the cabinet 12. Since the devices 104 cannot be swung upwardly beyond the position shown in Fig. 4, it is impossible to reach into the chute 42 even if the hopper 16 were not provided and thereby obtain a carton 10 without deposit of a coin 84. As soon as the shelves 36 engage the devices 104 and swing the same downwardly against the action of springs 108 and thereupon move to a position clearing the devices 104, springs 108 will return the devices 104 to the normal position shown in Fig. 4.

Having thus described the invention what is claimed as new and desired to be secured by Letters Patent is:

1. In a vending machine, a pair of vending assemblies each including an upright wall; a downwardly movable support adjacent said wall; a series of vertically-spaced units, each including a number of side-by-side, article-receiving shelves in sliding engagement with the wall and arranged in vertical rows; and means swingably mounting the shelves on the support, said wall being provided with shelf-clearing means for each row of shelves respectively, permitting successive tipping of the shelves by gravity under force of the weight of said articles thereon to discharge the articles as the support descends, said shelf-clearing means being progressively higher on the wall whereby the articles are discharged singly, the shelves of one assembly being offset relative to the shelves of the other assembly whereby the articles are vended alternately from the assemblies.

2. In a vending machine, a vertical conveyor having an ascendable stretch and a descendable stretch and including a pair of horizontally spaced, endless elements, a plurality of vertically-spaced, horizontal hinge rods interconnecting said elements, and a row of side-by-side, horizontally aligned shelves mounted on each rod respectively for individual vertical swinging movement, presenting a number of vertically aligned series of shelves throughout the length of the conveyor; and a vertical abutment between said stretches, each shelf having an ear slidable along the abutment during descent of the shelves for holding the latter against downward swinging movement on the rods, and an article-receiving projection disposed horizontally when the ear is in sliding engagement with the abutment, the lowermost end of said abutment being stepped, presenting a horizontal edge for each series of shelves respectively, said edges being disposed at differing heights whereby, as the shelves descend below the abutment, the ears will clear the latter in successive order, discharging the articles one at a time from each row of shelves before discharge of articles from the next succeeding row thereabove.

3. In a vending machine as set forth in claim 2, releasable structure operably coupled with said conveyor for holding said descendable stretch against descent under influence of the weight of articles on said projections.

4. In a vending machine as set forth in claim 3, said structure being provided with parts for limiting the extent of descent of said descendable stretch each time said structure is released.

5. In a vending machine as characterized by claim 4 wherein is provided power means operably coupled with said structure for releasing the latter.

6. In a vending machine as provided in claim 3, there being a rotatable member operably connected with said conveyor for rotation thereby, said structure having a device reciprocable toward and away from said member and normally holding the latter against rotation.

7. In a vending machine as provided in claim 3, there being a rotatable, toothed member operably connected with said conveyor for rotation thereby, said structure having a device reciprocable toward and away from said member and normally holding the latter against rotation, there being a pair of spaced ears on the device alternately engageable with the teeth of said member whereby the distance between the teeth determines the extent of each descent.

References Cited in the file of this patent

UNITED STATES PATENTS

| | | |
|---|---|---|
| 539,752 | Gale | May 21, 1895 |
| 2,154,147 | Bensemann | Apr. 11, 1939 |
| 2,644,735 | James | July 7, 1953 |
| 2,678,250 | Heinig | May 11, 1954 |
| 2,680,049 | Childres | June 1, 1954 |

FOREIGN PATENTS

| | | |
|---|---|---|
| 30,766 | Sweden | Jan. 25, 1909 |
| 383,575 | Germany | of 1923 |
| 442,407 | Great Britain | of 1936 |